(12) United States Patent
Kuipers et al.

(10) Patent No.: US 12,415,569 B2
(45) Date of Patent: Sep. 16, 2025

(54) ROCKER INSERT WITH CORRUGATED STRUCTURE

(71) Applicant: Shape Corp., Grand Haven, MI (US)

(72) Inventors: Matthew Kuipers, Holland, MI (US); Zehua Qin, Norton Shores, MI (US); Marcus Ashmore, Farmington Hills, MI (US); Bruce Walsh, West Bloomfield, MI (US)

(73) Assignee: Shape Corp., Grand Haven, MI (US)

( * ) Notice: Subject to any disclaimer, the term of this patent is extended or adjusted under 35 U.S.C. 154(b) by 324 days.

(21) Appl. No.: 18/152,038

(22) Filed: Jan. 9, 2023

(65) Prior Publication Data

US 2023/0219626 A1    Jul. 13, 2023

Related U.S. Application Data

(60) Provisional application No. 63/363,784, filed on Apr. 28, 2022, provisional application No. 63/297,296, filed on Jan. 7, 2022.

(51) Int. Cl.
*B62D 25/02* (2006.01)
*B62D 21/15* (2006.01)
*B62D 29/00* (2006.01)

(52) U.S. Cl.
CPC ......... *B62D 25/025* (2013.01); *B62D 21/157* (2013.01); *B62D 29/004* (2013.01)

(58) Field of Classification Search
CPC .... B62D 25/025; B62D 21/157; B62D 29/04; B62D 29/041; B60Y 2306/01; B60R 2019/026; B60R 2019/186

(Continued)

(56) References Cited

U.S. PATENT DOCUMENTS 5,680,886 A * 10/1997 Ohtsuka .................... F16F 7/12
                                                        296/187.03
6,435,601 B1 * 8/2002 Takahara .................. F16F 7/12
                                                        296/203.02

(Continued)

FOREIGN PATENT DOCUMENTS

DE    102007032245 A1    1/2009
DE    102010003497 A1    10/2011

(Continued)

OTHER PUBLICATIONS

JP2021024350 Text (Year: 2021).*

(Continued)

*Primary Examiner* — Dennis H Pedder
(74) *Attorney, Agent, or Firm* — Bodman PLC

(57) ABSTRACT

A vehicle rocker assembly may include a sill inner comprising a sill wall portion, an upper wall portion, a lower wall portion, an upper flange portion, and a lower flange portion. The vehicle rocker assembly may also include a sill outer comprising a sill wall portion, an upper wall portion, a lower wall portion, an upper flange portion, and a lower flange portion. The vehicle rocker assembly also includes a rocker insert disposed within the elongated hollow interior, the rocker insert comprising: an upper wall, a lower wall, and a side wall extending between the upper wall and the lower wall. At least one of the upper wall or the lower wall comprises a corrugated portion that has a ridge oriented to extend in a lateral vehicle direction.

19 Claims, 15 Drawing Sheets

(58) Field of Classification Search
USPC .............. 296/209, 205, 187.12, 30; 293/120
See application file for complete search history.

(56) References Cited

U.S. PATENT DOCUMENTS

| | | | |
|---|---|---|---|
| 7,963,378 B2 * | 6/2011 | Glance | ................. B62D 21/15 |
| | | | 293/109 |
| 9,493,190 B1 | 11/2016 | Alwan et al. | |
| 9,725,118 B2 | 8/2017 | Alwan et al. | |
| 10,011,304 B1 | 7/2018 | Donabedian et al. | |
| 10,046,422 B2 | 8/2018 | Baldwin | |
| 10,183,638 B2 | 1/2019 | Zannier | |
| 10,279,843 B2 | 5/2019 | Nakagawa et al. | |
| 10,328,978 B2 | 6/2019 | Yang et al. | |
| 10,370,040 B1 | 8/2019 | Cooper et al. | |
| 10,399,602 B2 | 9/2019 | Jun et al. | |
| 11,292,407 B2 * | 4/2022 | Riva | ....................... B60R 19/18 |
| 2019/0256150 A1 | 8/2019 | Cooper et al. | |
| 2019/0264769 A1 | 8/2019 | Gergely et al. | |
| 2020/0262491 A1 | 8/2020 | Shannon et al. | |
| 2021/0339803 A1 | 11/2021 | Haupt et al. | |
| 2021/0380173 A1 | 12/2021 | Kim | |
| 2022/0063731 A1 | 3/2022 | Tsubaki et al. | |
| 2022/0212720 A1 | 7/2022 | Oxley et al. | |
| 2022/0258802 A1 | 8/2022 | Tsubaki et al. | |
| 2022/0289298 A1 | 9/2022 | Kuipers | |
| 2022/0410982 A1 | 12/2022 | Hihara | |
| 2023/0011721 A1 | 1/2023 | Boettcher et al. | |
| 2023/0016200 A1 | 1/2023 | Matsui et al. | |
| 2023/0072451 A1 | 3/2023 | Song | |
| 2023/0102921 A1 | 3/2023 | Odhekar et al. | |
| 2023/0108456 A1 | 4/2023 | Karlsson et al. | |
| 2023/0111879 A1 | 4/2023 | Oxley et al. | |
| 2023/0126494 A1 | 4/2023 | Nihei | |
| 2023/0147528 A1 | 5/2023 | Qin et al. | |
| 2023/0159107 A1 | 5/2023 | Matecki et al. | |
| 2023/0159110 A1 | 5/2023 | Hwang | |
| 2023/0202578 A1 | 6/2023 | Maruyama | |
| 2023/0202581 A1 | 6/2023 | Maruyama et al. | |
| 2023/0202582 A1 | 6/2023 | Inagaki et al. | |
| 2023/0219628 A1 | 7/2023 | Hong et al. | |
| 2023/0226898 A1 | 7/2023 | Lee et al. | |

FOREIGN PATENT DOCUMENTS

| | | | | |
|---|---|---|---|---|
| DE | 102012206032 B4 | | 6/2017 | |
| DE | 102017006057 B4 | | 5/2021 | |
| EP | 1331160 A1 | | 7/2003 | |
| EP | 1806271 A2 | | 7/2007 | |
| EP | 2927101 A1 | | 10/2015 | |
| EP | 3057851 B1 | | 1/2018 | |
| EP | 3851335 A1 | | 7/2021 | |
| FR | 3050165 A1 | | 10/2017 | |
| JP | H05319301 A | | 12/1993 | |
| JP | 2004051095 A | | 2/2004 | |
| JP | 2010274848 A | | 12/2010 | |
| JP | 2021024350 A * | | 2/2021 | ............... B60K 1/04 |
| JP | 2021146973 A | | 9/2021 | |
| JP | 6964642 B2 | | 10/2021 | |
| KR | 102447256 B1 | | 9/2022 | |
| WO | 2017157886 A1 | | 9/2017 | |
| WO | 2019059821 A1 | | 3/2019 | |
| WO | 2020225766 A1 | | 11/2020 | |
| WO | 2021019959 A1 | | 2/2021 | |
| WO | 2021060660 A1 | | 4/2021 | |
| WO | 2021071410 A1 | | 4/2021 | |
| WO | 2021116546 A1 | | 6/2021 | |
| WO | 2021180403 A1 | | 9/2021 | |
| WO | 2021234433 A1 | | 11/2021 | |
| WO | 2021244792 A1 | | 12/2021 | |
| WO | 2021259840 A1 | | 12/2021 | |
| WO | 2021259971 A1 | | 12/2021 | |
| WO | 2022086005 A1 | | 4/2022 | |
| WO | 2022192706 A1 | | 9/2022 | |
| WO | 2022234999 A1 | | 11/2022 | |
| WO | 2022238458 A1 | | 11/2022 | |
| WO | 2022249782 A1 | | 12/2022 | |
| WO | 2023004309 A1 | | 1/2023 | |
| WO | 2023277440 A1 | | 1/2023 | |
| WO | 2023277441 A1 | | 1/2023 | |
| WO | 2023277567 A1 | | 1/2023 | |
| WO | 2023285005 A1 | | 1/2023 | |
| WO | 2023012056 A1 | | 2/2023 | |
| WO | 2023014808 A1 | | 2/2023 | |
| WO | 2023016113 A1 | | 2/2023 | |
| WO | 2023044429 A1 | | 3/2023 | |
| WO | 2023052279 A1 | | 4/2023 | |
| WO | 2023052388 A1 | | 4/2023 | |
| WO | 2023064868 A1 | | 4/2023 | |
| WO | 2023069918 A1 | | 4/2023 | |
| WO | 2023079804 A1 | | 5/2023 | |
| WO | 2023079805 A1 | | 5/2023 | |
| WO | 2023081810 A1 | | 5/2023 | |
| WO | 2023085162 A1 | | 5/2023 | |
| WO | 2023085689 A1 | | 5/2023 | |
| WO | 2023088660 A1 | | 5/2023 | |
| WO | 2023089887 A1 | | 5/2023 | |
| WO | 2023090112 A1 | | 5/2023 | |
| WO | 2023090706 A1 | | 5/2023 | |
| WO | 2023094389 A1 | | 6/2023 | |

OTHER PUBLICATIONS

International Search Report for Application No. PCT/US2023/016452; mailed Jun. 13, 2023; 3 pp.

International Search Report for Application No. PCT/US2023/066406; mailed Aug. 21, 2023; 5 pp.

International Search Report for Application No. PCT/US2023/074116; mailed Jan. 18, 2024; 5 pp.

International Search Report for Application No. PCT/US2023/076015; mailed Mar. 12, 2024; 4 pp.

International Search Report for Application No. PCT/US2024/020186; mailed Jun. 27, 2024; 3 pp.

International Search Report for Application No. PCT/US2023/060333; mailed May 4, 2023; 4 pp.

* cited by examiner

ROCKER INSERT WITH CORRUGATED STRUCTURE

CROSS-REFERENCE TO RELATED APPLICATIONS

This application claims priority under 35 U.S.C § 119(e) to U.S. Provisional Patent Application No. 63/363,784, filed Apr. 28, 2022 and to U.S. Provisional Patent Application No. 63/297,296, filed Jan. 7, 2022, the disclosures of which are considered part of this application and are hereby incorporated by reference in their entireties.

TECHNICAL FIELD

The present disclosure relates to sill assemblies and more specifically to rocker inserts for vehicle body structures.

BACKGROUND

Vehicle frames and body structures are designed to support the vehicle and undergo and absorb certain levels of impact forces, such as to prevent distances of inboard intrusion into the vehicle in accordance with insurance requirements and other regulatory and legal requirements. Side impacts to a vehicle are commonly tested with side pole impact testing, which deliver significant side impact forces to the vehicle. Vehicle frames primarily absorb these side impacts at rocker sections that run longitudinally between the front and rear wheels along the lower outboard portions of the vehicle frame.

With the incorporation of battery trays in electric and hybrid electric vehicles in the lateral inboard area between opposing rocker sections, it is desirable for the side impact forces to be directed away from the battery tray and towards a vehicle floor cross member. For example, it is generally known to increase stiffness of a vehicle sill assembly such as by adding a rocker insert within the vehicle sill assembly.

SUMMARY

The present disclosure provides a vehicle rocker assembly. Examples of the vehicle rocker assembly may include a sill inner comprising a sill wall portion, an upper wall portion, a lower wall portion, an upper flange portion, and a lower flange portion. The vehicle rocker assembly may also include a sill outer comprising a sill wall portion, an upper wall portion, a lower wall portion, an upper flange portion, and a lower flange portion. The vehicle rocker assembly also includes a rocker insert disposed within the elongated hollow interior. The rocker insert provides a corrugated portion that has a ridge oriented to extend in a lateral vehicle direction, where the structure of the corrugated shape is configured to stiffen the rocker assembly for lateral impact forces received at the vehicle. The corrugated portion is configured to substantially span between the sill wall portions of the sill inner and outer during impact, so as to support elongated hollow interior and improve inboard intrusion from the lateral impact energy.

Implementations of the disclosure may include one or more of the following optional features. In some examples, the side wall is coupled with the sill inner or the sill outer to support the rocker insert in the elongated hollow interior. Also, in some implementations, the rocker insert includes a tubular member at least partially defined by the upper wall, the lower wall, and the side wall and the tubular member may define a hollow interior. In some examples, the rocker insert includes a plastic portion and a metal portion, where the metal portion comprises the corrugated portion and the plastic portion is attached to the metal portion to provide support and attachment features within the elongated hollow interior of the sill inner and the sill outer.

In addition, the corrugated portion in some examples is disposed on both a top surface and bottom surface of the upper wall, so as to provide a corrugated shape with the body or thickness of the upper wall. In some examples, the corrugated portion is disposed on both a top surface and a bottom surface of the lower wall, so as to similarly provide a corrugated shape with the body or thickness of the lower wall. Also, the corrugated portion may disposed on both the upper wall and the lower wall of the reinforcement insert. Further, the upper and the lower walls may comprise a metal sheet, such that the thickness of the metal sheet defines a corrugated shape.

In some examples, the ridge has a v-shape, defined by straight segments interconnecting at a relatively sharp bend or connection point. Also, in some implementation, the ridge has a u-shape, defined by straight segments interconnecting at a curved bend or connection point. In some examples, the corrugated portion has alternating ridges and furrows that may have different shapes and spacing, such as a wave shape with consistent, different, or varying amplitudes and wavelengths.

The details of one or more implementations of the disclosure are set forth in the accompanying drawings and the description below. Other aspects, advantages, purposes, and features will be apparent upon review of the following specification in conjunction with the drawings.

BRIEF DESCRIPTION OF THE DRAWINGS

Like reference numerals indicate like parts throughout the drawings.

DETAILED DESCRIPTION

Figure 1:
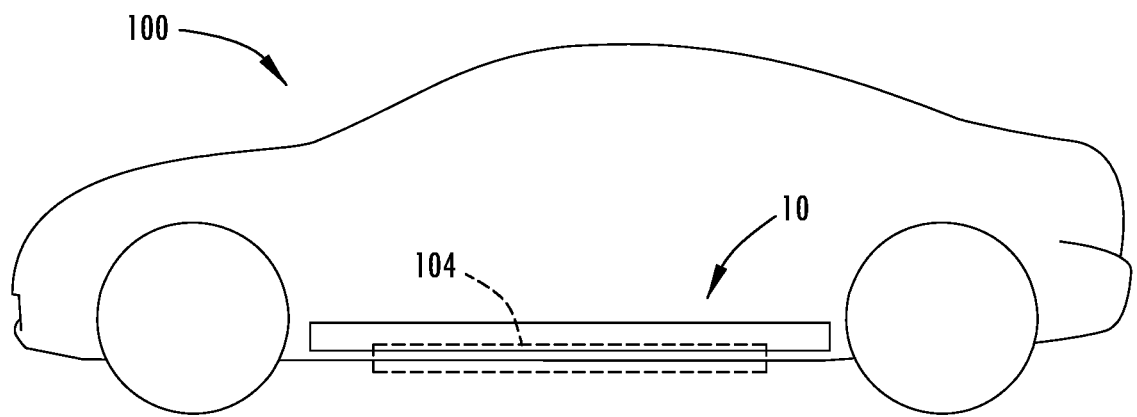
FIG. 1 is a side elevation view of a vehicle schematically showing a rocker assembly and a battery tray enclosure.
Figure 2:
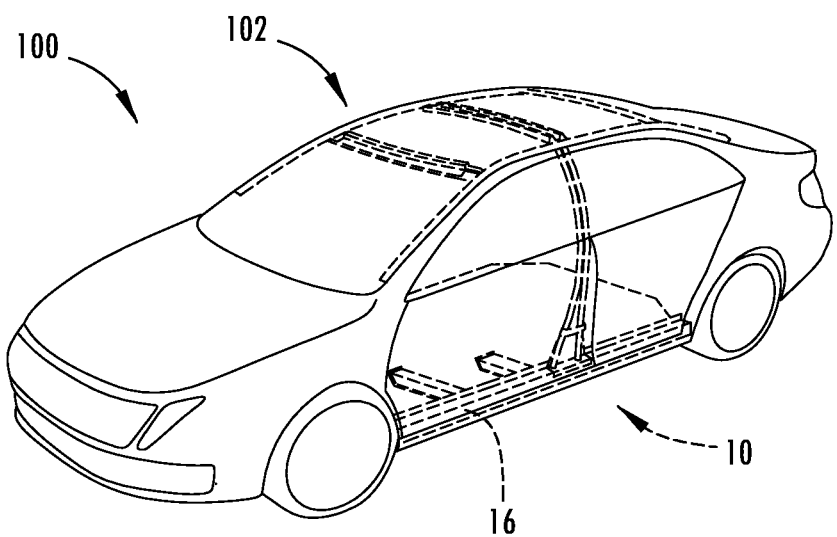
FIG. 2 is a perspective view of a vehicle schematically showing a rocker assembly and other structural components.

Referring now to the drawings and the illustrative embodiments depicted therein, a rocker assembly is provided for a vehicle 100, such as for a body structure or frame 101 as shown in FIGS. 1 and 2. The vehicle frame 101 and associated components may have various designs and configurations, such as for different styles and types of vehicles. As shown for example FIGS. 1 and 2, the vehicle frame has various structural component, including a B-pillar 103, a hinge pillar 104, a floor cross-member 105, a roof bow 106, and a header 107, among other structural components that support the body of the vehicle and protect passengers, engine components, and sensitive electronics from damage when undergoing collisions. In some examples, the vehicle may be operated by a propulsion system that uses a battery, such as a battery or battery modules that may be supported in a battery tray 108 generally located between the axles and below the floor 109 to distribute the battery weight and establish a low center of gravity for the vehicle.

Figure 3:
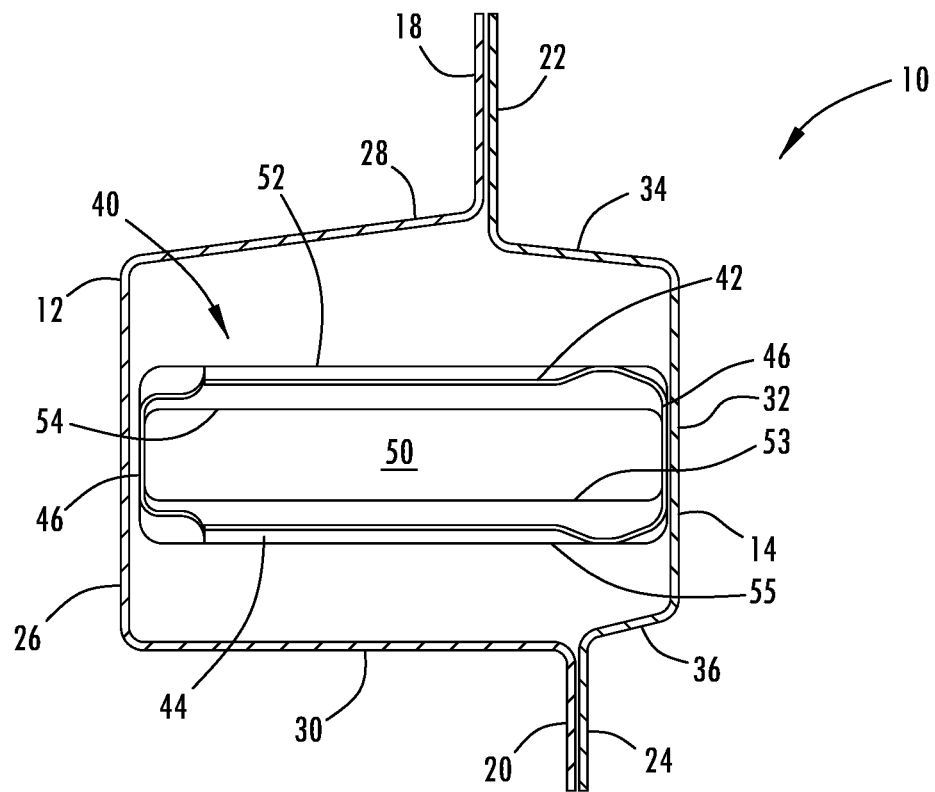
FIG. 3 is a cross-sectional view of an example of a vehicle rocker assembly including a rocker insert.

The vehicle rocker component includes a sill panel or panels, such as a sill inner panel 12 and sill outer panel 14 that attach together around an interior area 16, where the terms "inner" and "outer" are made in reference to inboard or inward facing and outboard or outward facing directions on the vehicle, such oriented in FIG. 1. As shown in FIGS. 2 and 3, the example of the vehicle rocker assembly 10 is provided with a reinforcement insert disposed in the interior area 16 to form a multi-tubular rocker structure. The rocker assembly 10 shown in FIG. 2 is disposed alongside an outer section of a battery tray 108 with the floor cross-member 105 being attached to the vehicle rocker assembly 10 so as to span laterally over the battery tray 108. Accordingly, the vehicle component in additional implementations may also or alternatively be provided as a battery tray frame component, such as a longitudinally oriented side wall section of the battery tray.

When designing the vehicle rocker assembly with a rocker insert disclosed herein, the outer dimensions of the vehicle rocker assembly may be reduced and the overall weight of the vehicle rocker assembly may be reduced while meeting the required impact and loading conditions. The rocker insert may span a partial section of the vehicle rocker assembly or the entire length of the rocker assembly, such as to extend beyond the rocker assembly into and to also reinforce an adjacent component. The rocker insert disclosed herein may comprise the entire vehicle component or may be joined to additional reinforcements or parts of the vehicle component, such as at desired sections of the vehicle component. Further, in some examples the rocker assembly may be embodied as a subassembly or as part of a corresponding vehicle component, such as a structural component or a battery tray component and as such may be designed to undergo various impact forces and to support and sustain different loading conditions.

Moreover, the rocker insert disclosed herein may be formed with one or more pieces of sheet material, such as by roll forming a metal sheet, to provide the structure with a relatively high strength (for shear and axial loading) and low weight in comparison to common rocker panels, such as to allow the still panels of the corresponding vehicle component (if provided) to use less material, occupy a smaller packaging space, and have greater flexibility in the outer shape design. The cross-sectional shape of different examples of the vehicle component and rocker insert may include various shapes and thicknesses for the desired application of the vehicle component.

Unless specified to the contrary, it is generally understood that additional implementations of the rocker component may have an opposite orientation from the examples shown and described, such as where the sill panels identified as an inner panel may be used as the outer panel and the sill panels identified as an outer panel may be used as the inner panel. The cross-sectional shape of the inner and outer panels may vary along the rocker, such as, for example, by flaring outward at the ends.

Referring now to the vehicle rocker assembly 10 shown in FIG. 3, a first sill panel 12 and a second sill panel 14 are attached together to surround a hollow interior space 16 between the sill panels 12, 14. The vehicle rocker assembly 10 shown in FIG. 3 is embodied as a vehicle rocker component. Accordingly, the first sill panel 12 may be referred to as a sill inner panel of a rocker component. The first sill panel 12 has an upper flange 18 and a lower flange 20 that extend along respective upper and lower edges of the inner panel. The first sill panel 12 protrudes inboard from the upper and lower flanges 18, 20 to form outward facing concave structures. The second sill panel 14, which may be referred to as a sill outer panel of a rocker component, has a C-shaped cross section with flanges 22, 24, which may similarly be referred to as an upper flange 22 and a lower flange 24. The upper flanges 18, 22 and the lower flanges 20, 24 of the inner and outer sill panels 12, 14 are attached together, such as via welding, with the concave structures facing each other. The upper and lower flanges 18, 20, 22, 24 of each of the sill panels 12, 14 shown in FIG. 3 extend longitudinally, continuously along the edges of the rocker component; however, it is contemplated that the flanges may be trimmed away in select areas to facilitate frame attachment or to reduce weight.

As further shown in FIG. 3, the inner and outer sill panels 12, 14 are joined together to define a hollow interior space 16 between the sill panels 12, 14. The upper and lower flanges 18, 20, 22, 24 are substantially planar and oriented in a generally vertical configuration, such as to mate in generally continuous contact along the length of the component. The upper and lower flanges 18, 20, 22, 24 may be joined together via welding, and preferably spot welding, although it is conceivable that alternative welding methods or joining means may be used in addition or in the alternative to spot welding in different implementations of a rocker component, such as adhesive or fasteners or the like.

The first sill panel 12, or inner panel of the vehicle rocker assembly 10, has an inner wall 26 that is substantially planar. The inner wall 26 integrally interconnects with a corner transition to an upper wall 28 and a lower wall 30 at the respective upper and lower ends. The corner transitions are approximately 90 degrees between the inner wall 26 and the upper and lower walls 28, 30. Also, the corner transitions are defined by the longitudinal bends to a sheet material that forms the first sill panel 12, such as a metal sheet (e.g., an advanced high strength steel sheet or aluminum sheet). Similarly, the upper and lower walls 28, 30 each have a corner transition of approximately 90 degrees to the upper flange 18 and the lower flange 20, respectively. The corner transitions are also defined by longitudinal bends in the sheet material of the first sill panel 12, such as formed by a roll form process. As also shown in FIG. 3, the upper and lower flanges 18, 20 are substantially planar and oriented in parallel alignment with the planar extent of the inner wall 26. The upper and lower walls 28, 30 of the first sill panel 12 are also substantially planar and, as shown in FIG. 3, are substantially parallel to each other, although in additional examples they may be slightly angled from each other. The corner transitions may also have an angular transition greater or less than shown in FIG. 3, such as approximately between 40 and 120 degrees, between 70 and 100 degrees, between 80 and 95 degrees, or between 82 and 92 degrees.

As also shown in FIG. 3, the second sill panel 14 or outer panel of the vehicle rocker assembly 10 has an outer wall 32 that is substantially planar and integrally interconnects with an upper wall 34 and a lower wall 36 at its respective upper and lower ends. The corner transitions of approximately 80 degrees between the outer wall 32 and the upper and lower walls 34, 36 are defined by longitudinal bends to a sheet material that forms the second sill panel 14. The sheet material may be the same or different from the first sill panel 12 and may include a metal sheet, such as an advanced high strength steel sheet or aluminum sheet. Similarly, the upper wall 34 also has a corner transition to the upper flange 22 and the lower wall 36 has a corner transition to the lower flange 24, which are each also defined by longitudinal bends in the sheet material of the second sill panel 14. Again, the corner transitions between the upper and lower walls 34, 36 and the upper and lower flanges 22, 24 and the outer wall 32 may have an angular transition greater or less than shown in FIG. 4, such as approximately between 40 and 120 degrees, between 70 and 100 degrees, between 80 and 95 degrees, or between 82 and 92 degrees.

As shown in FIG. 3, the upper and lower flanges 22, 24 are substantially planar and oriented in parallel alignment with the planar extent of the outer wall 32. The upper and lower walls 34, 36 of the second sill panel 14 are also substantially planar, but are slightly angled from being orthogonal to the outer wall 32 and flanges 22, 24. With the flanges 18, 20, 22, 24 of the panels 12, 14 attached together, the walls thereof define a substantially hexagonal cross-sectional shape; however, it is appreciated that additional examples of the rocker insert may have various alternative cross-sectional shapes (e.g., a substantially rectangular shape) and different wall configurations for the corresponding vehicle design (e.g., portions of the inner or outer walls that are not vertically oriented). It is also contemplated that in other examples the outer sill and the inner sill may each include a different configuration including but not limited to the outer sill having an inward or outward protruding stiffening rib portion configured to provide additional stiffness and side impact support.

Figure 4:
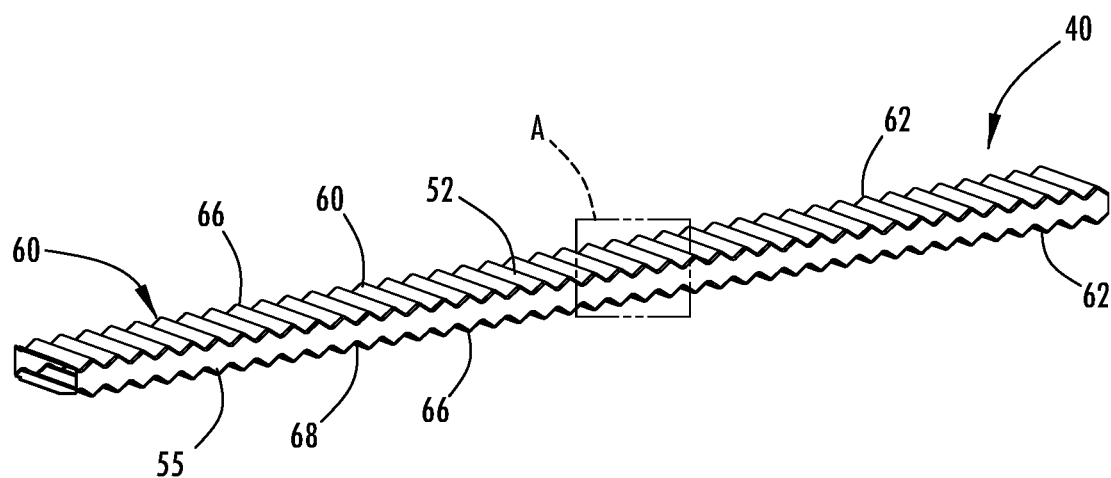
FIG. 4 is a perspective view of the rocker insert shown in FIG. 3.

As further shown in FIGS. 3 and 4, the vehicle rocker assembly 10 includes a rocker insert 40 disposed within the elongated hollow interior 16. The rocker insert 40 includes an upper wall 42, a lower wall 44, and a side wall 46 extending between the upper wall 42 and the lower wall 44. In some examples, a tubular member 48 is at least partially defined by the upper wall 42, the lower wall 44, and the side wall 46 defining a hollow interior 50. In some examples, the side wall 46 is coupled with the sill inner 12 or the sill outer 14 to support the rocker insert 40 in the elongated hollow interior 16. In other examples, opposing side walls 46 couple the upper wall 42 and the lower wall 44 and the opposing side walls 46 may be coupled to the sill inner 12 and the sill outer 14 to support the rocker insert 40 in the elongated hollow interior 16. In other examples, the rocker insert 40 may include a flange or other additional component configured to be coupled to one or more of the upper wall 42 or the lower wall 44 and the sill inner 12 or the sill outer 14 to support the rocker insert 40 in the elongated hollow interior 16.

In some examples one or more of the upper wall 42, the lower wall 44, and the at least one side wall 46 are generally rectangular such that they include top surfaces and bottom surfaces coupled by opposing side surfaces. In the example shown in FIG. 3, at least one of the upper wall 42 and the lower wall 44 are comprised of steel. Additionally, the side walls 46 may also be comprised of steel. However, it is also contemplated that one or more of the upper wall 42, the lower wall 44, or the side walls 46 may be comprised of another material including but not limited to stainless steel, other metallic materials, and plastic polymer materials.

In some examples, one or more of the upper wall 42 and the lower wall 44 are generally rectangular in shape and coupled by opposing sidewalls which are also generally rectangular, however, the opposing side walls 46 have a smaller thickness than the upper and the lower walls 42, 44. Additionally, in the example shown in the upper wall 42 and the lower wall 44 have the same thickness however other configurations have been contemplated including but not limited to the upper wall 42 having a larger thickness than the lower all or the lower wall 44 having a larger thickness than the upper wall 42.

Figure 5A:
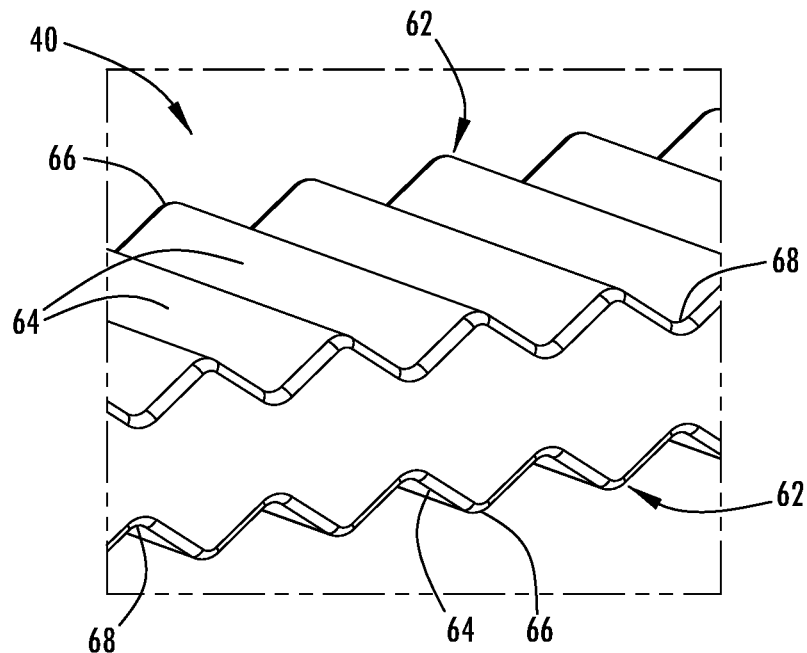
FIG. 5A is a partial enlarged perspective view of the rocker insert shown at section A in FIG. 4.
Figure 5B:
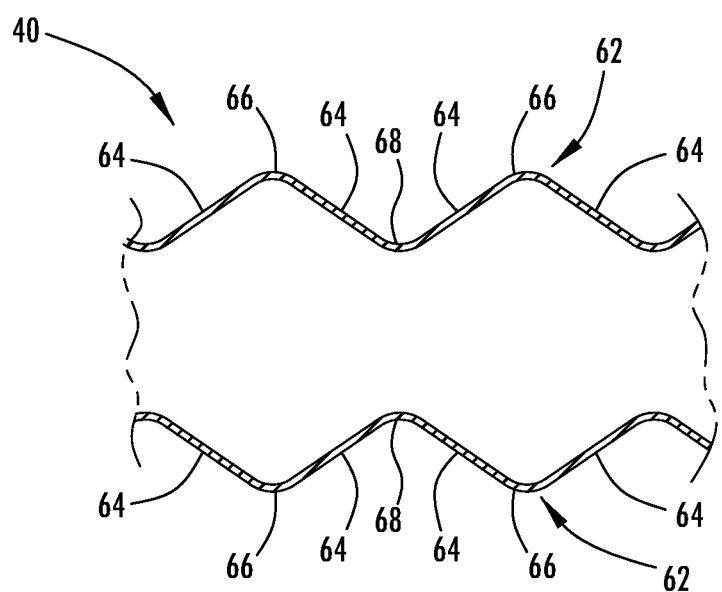
FIG. 5B is a partial cross-sectional view of the rocker insert shown in FIG. 3.

Referring now to the example shown in FIGS. 5A and 5B, at least one of the upper wall 42 or the lower wall 44 includes a corrugated portion 60. The corrugated portion 60 may be disposed on any surface of the upper or lower wall 44. In some examples, the corrugated portion 60 is disposed on one of the top surface 52 or the bottom surface 54 of the upper wall 42. In some examples, the corrugated portion 60 is disposed on both the top surface 52 and bottom surface 54 of the upper wall 42. In other examples, the corrugated portion 60 is disposed on the top surface 53 or the bottom surface 55 of the lower wall 44. In some examples, the corrugated portion 60 is disposed on both the top surface 53 and the bottom surface 55 of the lower wall 44. In still other examples, the corrugated portion 60 is disposed on both the top surface 52, 53 and a bottom surface 54, 55 of both the upper wall 42 and the lower wall 44. Additionally, it has been contemplated that one or more surface of one or more of the opposing side walls 46 may also include the corrugated portion 60. Moreover, it is contemplated that the top surface 52 and the bottom surface 54 may be the same or different. Additionally, it is contemplated that the top surface 53 and the bottom surface 55 of the lower wall 44 may be the same or different. Moreover, it is contemplated that the top surface 52 of the upper wall 42 and the top surface 53 of the lower wall may be the same or different and/or the bottom surface 54 of the upper wall 42 and the bottom surface 55 of the lower wall 44 may be the same or different.

In some examples, the corrugated portion 60 comprises alternating ridges 62 and furrows 64. In the example shown in FIGS. 5A and 5B, the corrugated portion 60 has a ridge 62 oriented to extend in a lateral vehicle direction. The lateral vehicle direction generally extends across the width dimension of the vehicle. In contrast, the longitudinal vehicle direction generally extends along the length dimension of the vehicle. In some examples, an apex 66 of the ridge 62 may be disposed in a generally horizontal plane. The ridges 62 of the corrugated portion 60 are configured to be oriented to generally align with anticipated lateral impacts to the side of a vehicle, so as to provide increased stiffness to the corresponding portion of the upper or lower wall 44 of the rocker insert 40. Moreover, the ridge 62 of the corrugated portion 60 extends at least partially between the sill wall portions of the sill inner 12 and the sill outer 14. In some examples the corrugated portion 60 may be across an entire surface or may be disposed on only a portion of the surface. The ridges 62 and the furrows 64 may be of any shape and side as desired, including but not limited to the ridge 62 being a v-shape or a u-shape and/or the furrow 64 being a v-shape or a u-shape. It is also contemplated that the ridge 62 and the furrow 64 may be the same shape or may be different shapes than one another, if desired. Moreover, it is contemplated that the ridges 62 and/or the furrows 64 may be a single repeating shape, may be alternating shapes, or any pattern as desired.

In some examples, a height of the apex 66 of the ridge 62 is the same as the depth of the lowest point 68 on the furrow. However, it is also contemplated that the height of the apex 66 and the depth of the lowest point 68 on the furrow 64 may be different than one another such that the height of the apex 66 of the ridge 62 is larger than the depth of the lower point on the furrow 64 or vice versa. Additionally, it is contemplated that the heights of apex 66 of the ridges 62 may remain constant along the corrugated portion 60. However, it is also contemplated that the height of the apex 66 of the ridges 62 may be variable along the corrugated portion 60. Similarly, it is contemplated that the depth of the lowest point 68 on the furrow 64 may remain constant along the corrugated portion 60. However, it is also contemplated that the depth of the lowest point 68 of the furrow 64 may be variable along the corrugated portion 60.

In some examples, a width of the ridge 62 is the same width as the furrow 64. However, it is also contemplated that the width of the ridge 62, measured from a center of one furrow 64 to the center of an adjacent furrow 64, and the width of the furrow 64, measured from the apex 66 of one ridge 62 to the apex 66 of another ridge, may be different than one another such that the width of the ridge 62 is larger than the width of the furrow 64 or such that the width of the furrow 64 is larger than the width of the ridge. Moreover, it is contemplated that the width of the ridges 62 may remain constant along the length of the corrugated portion 60. However, it is also contemplated that the width of the ridge 62 may be variable along the corrugated portion 60. Similarly, it is contemplated that the width of the furrows 64 remain constant along the length of the corrugated portion 60. However, it is also contemplated that the width of the furrow 64 may be variable along the corrugated portion 60.

In some examples, the furrow 64 has a width of approximately 0.5-1.5 mm. In other examples the furrow 64 has a width of approximately 0.8-1.3 mm. In yet another example, the furrow 64 has a width of approximately 0.9-1.1 mm. In one example, the furrow 64 has a width of approximately 0.9 mm. In another example, the furrow 64 has a width of approximately 1.1 mm. However, various other furrow 64 widths have been contemplated.

Figure 6:
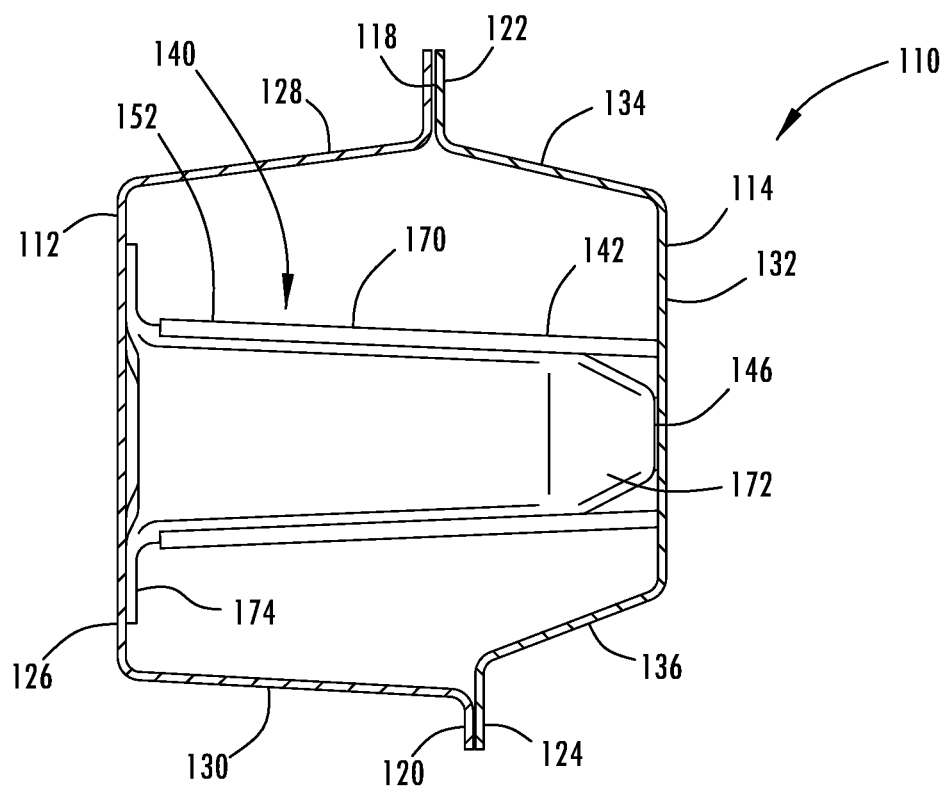
FIG. 6 is a cross-sectional view of a vehicle rocker assembly including another example of a rocker insert.
Figure 7:
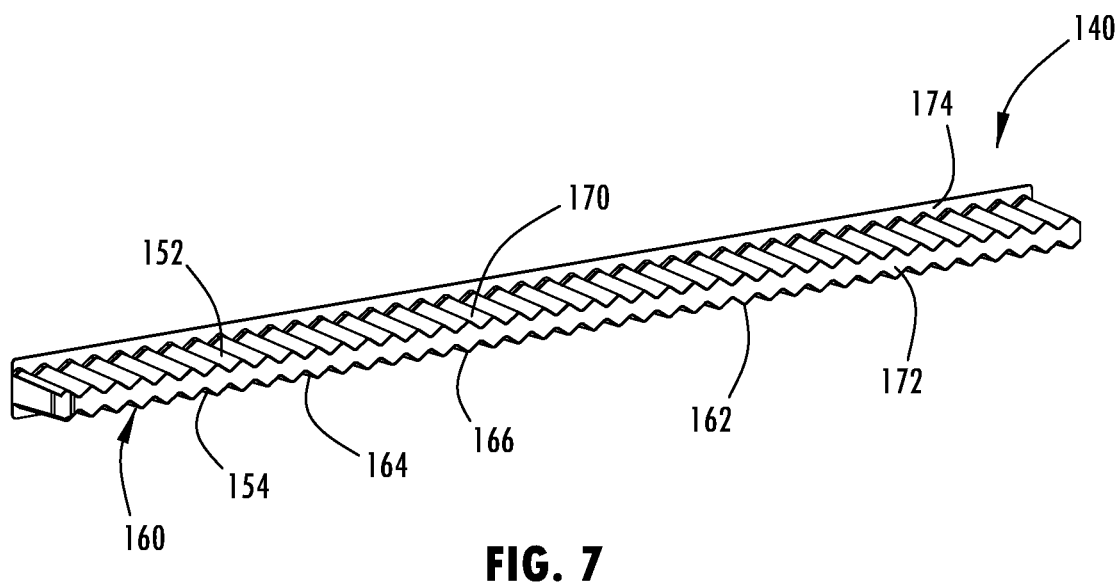
FIG. 7 is a perspective view of the rocker insert shown in FIG. 6.

Referring now to the example shown in FIGS. 6 and 7, the rocker insert 140 shown is similar to the rocker insert 40 as described above with respect to the example shown in FIGS. 3-5B including but not limited to the rocker insert 140 including the upper wall 142, the lower wall 144, the side wall 146 extending between the upper wall 142 and the lower wall 144, and the corrugated portion 160. However, in the example shown in FIGS. 6 and 7, the rocker insert 140 is comprised of a plastic/metal hybrid material. In one example, the rocker insert 140 is has a metal insert 170 which is overmolded by a plastic portion 172 to provide the final rocker insert 140. It is also contemplated that in other examples the metal portion may be coupled to the plastic portion in various means, including, for example, adhesive, fasteners, friction fit, or the like. The plastic/metal hybrid material provides additional mass savings while still providing a strength improvement over known rocker inserts. The rocker insert 140 may also include an integrated flange 174 having a height greater than the thickness of the upper wall 142 and/or lower wall 144 in order to secure the rocker insert 140 to various other vehicle components including but not limited to the sill inner 12 and the sill outer 14. The integrated flange 174 may also be configured to allow the side walls 146 to be secured to the upper wall 142 and the lower wall 144. In one example, the flange is made integral with the metal insert 170, however, it may also be formed by the plastic material 172 or a separate flange. In some examples the metal material is steel, however, stainless steel and other metal materials have also been contemplated. In some examples the plastic material is a plastic polymer materials, however other plastic materials have been contemplated.

Figure 8:
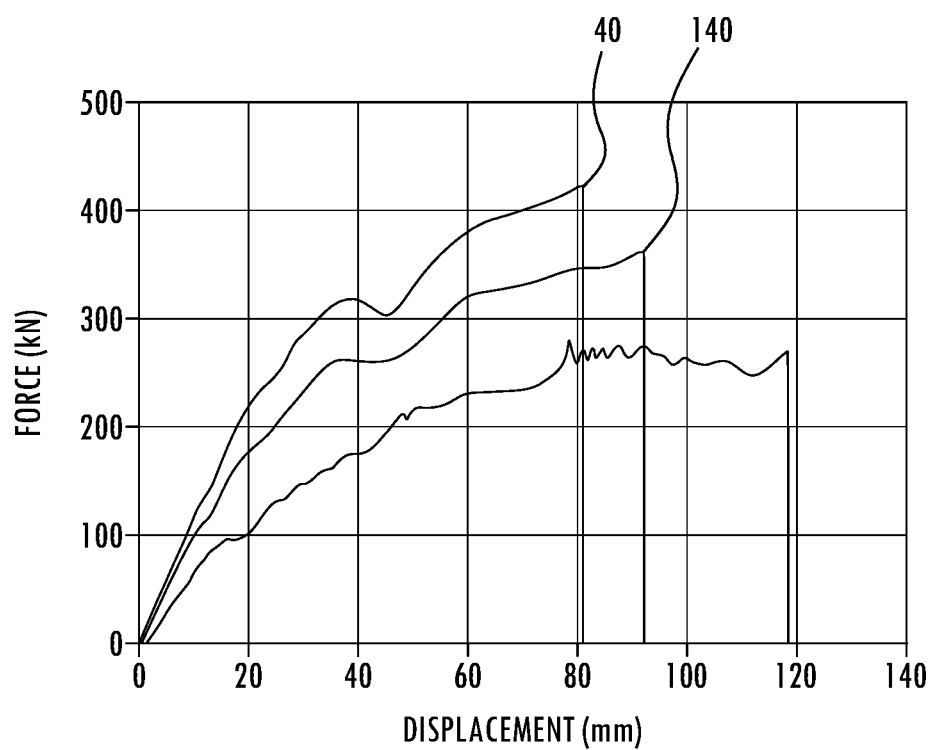
FIG. 8 is a graphical representation of improved displacement with use of the rocker inserts shown in FIGS. 3 and 6.
Figure 9:
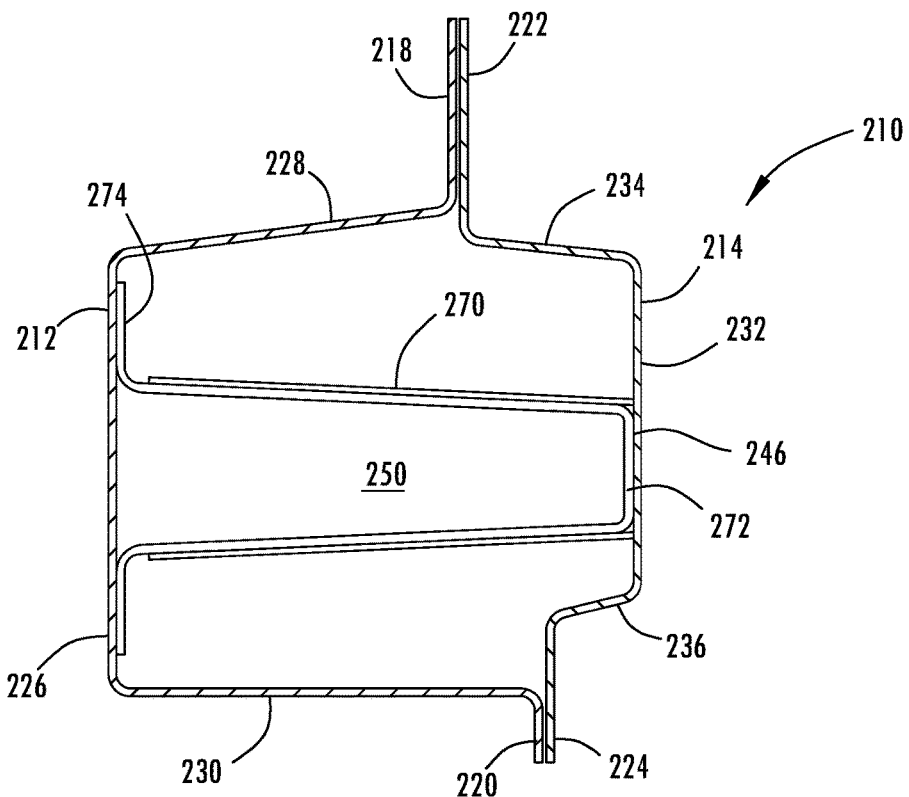
FIG. 9 is a cross-sectional view of a vehicle rocker assembly including a further example of a rocker insert, taken at line IX-IX in FIG. 10.
Figure 10:
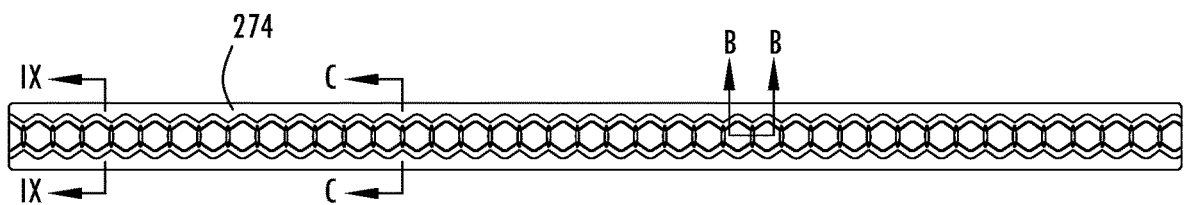
FIG. 10 is a side elevation view of the rocker insert shown in FIG. 9, taken from an inboard side of the rocker insert.
Figure 11:
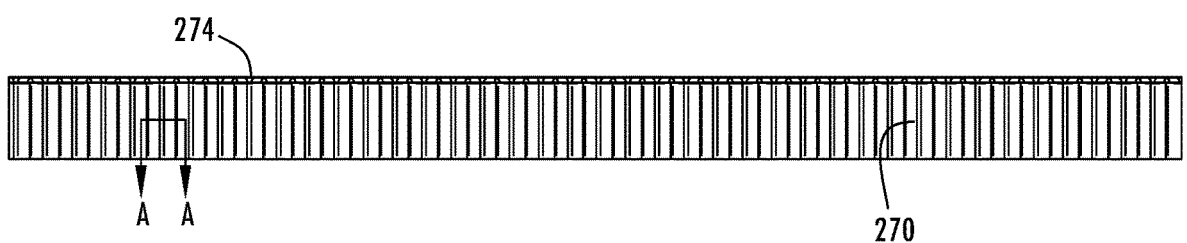
FIG. 11 is a top plan view of the rocker insert shown in FIG. 9.

Referring now to FIG. 8, in some examples such as the examples described above, having a rocker insert 40, 140 with a corrugated portion 60 reduces mass by up to approximately 42% while also providing approximately a 22% reduction in overall intrusion providing a light-weight, yet strong rocker insert 40, 140.

The inner and outer sill panels 12, 14 and rocker insert may be roll-formed from an advanced high-strength steel with a tensile strength above 1,000 MPA, such as approximately 1,500 MPA. The metal sheet used to roll form the center wall or membrane of rocker insert may be approximately 1.2 mm in thickness, such as between 1.0 mm and 1.6 mm. Also, the steel sheet used for the rocker insert and panels of the vehicle component may be galvanized, so as to have a zinc coating that protects against corrosion. In some examples, however, the steel sheet of the rocker insert 40 may not be galvanized, and in other examples the steel sheets that form the vehicle component may not be galvanized. In further examples, the metal sheet that forms the rocker insert is an aluminum sheet. The length of the inner sill panel 12 is substantially equal to a length of the outer sill panel 14. In additional implementations, the length of the inner sill panel 12 may be shorter than the length of the hollow interior space of the corresponding component, such as between 40% and 100%, between 30% and 90%, or between 30% and 60% of the length of the rocker insert. The sill inner 12 and sill outer 14 may be coupled by welding, using fasteners, adhesive, or another coupling method. The coupling of the rocker insert 40 and one of the sill inner 12 and the sill outer 14 may provide additional strength to the vehicle rocker assembly.

Figure 12A:
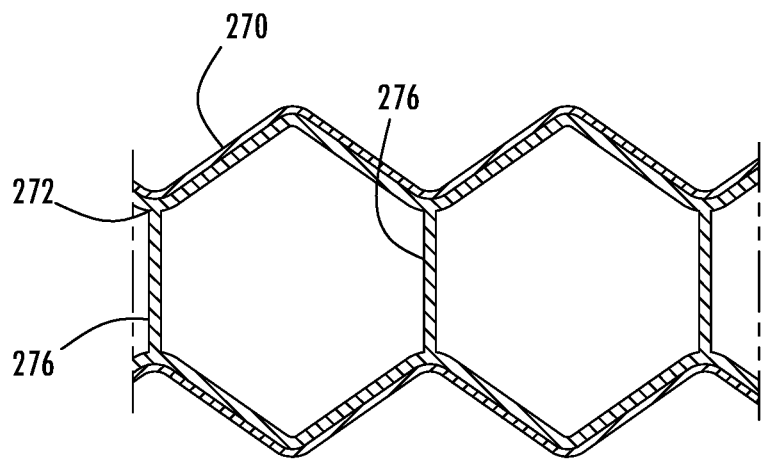
FIG. 12A is a cross-sectional view of the rocker insert, taken at line A-A in FIG. 11.
Figure 12B:
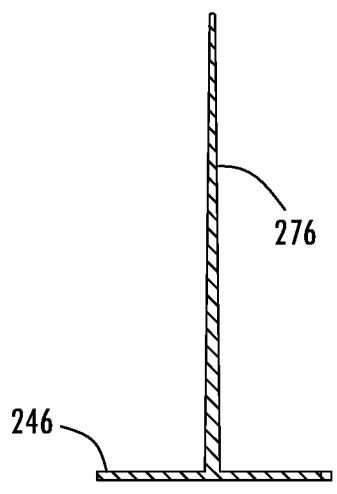
FIG. 12B is a cross-sectional view of the rocker insert, taken at line B-B in FIG. 10.
Figure 12C:
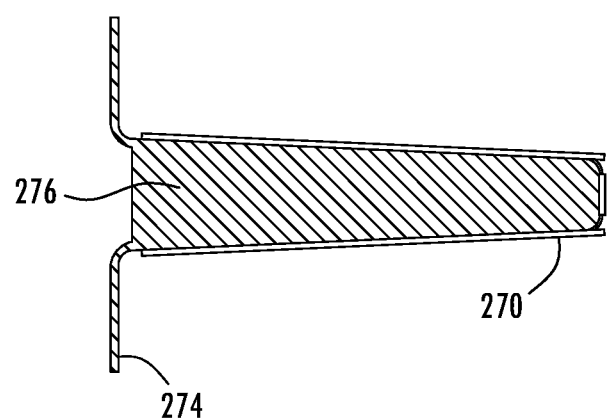
FIG. 12C is a cross-sectional view of the rocker insert, taken at line C-C in FIG. 10.
Figure 13:
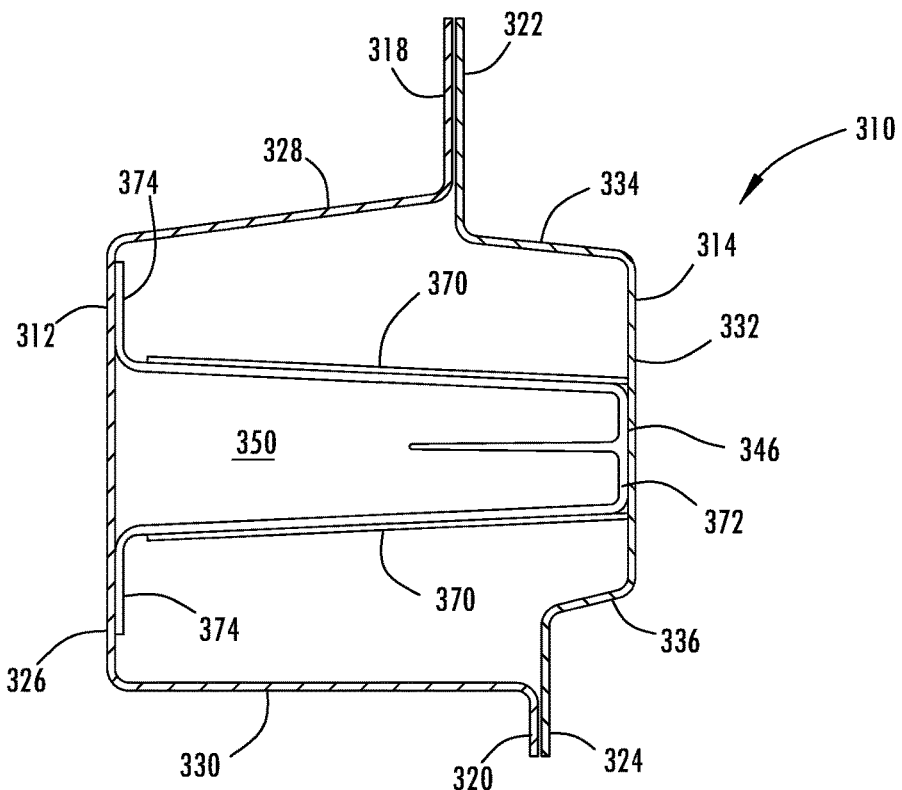
FIG. 13 is a cross-sectional view of a vehicle rocker assembly including a further example of a rocker insert, taken at line XIII-XIII in FIG. 14.
Figure 14:
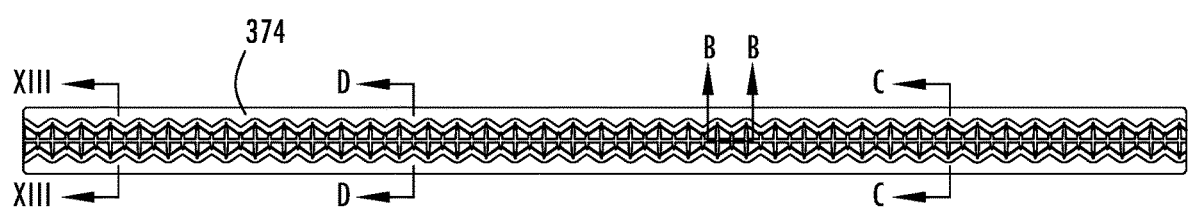
FIG. 14 is a side elevation view of the rocker insert shown in FIG. 13, taken from an inboard side of the rocker insert.
Figure 15:
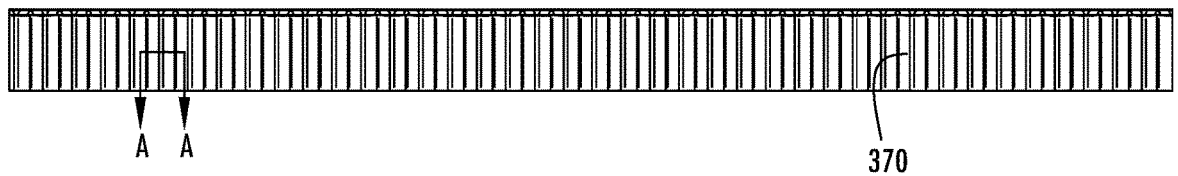
FIG. 15 is a top plan view of the rocker insert shown in FIG. 13.
Figure 16A:
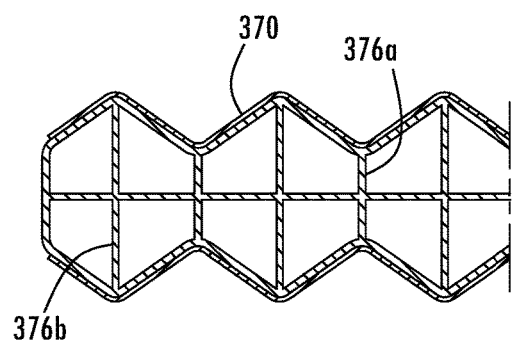
FIG. 16A is a cross-sectional view of the rocker insert, taken at line A-A in FIG. 15.
Figure 16B:
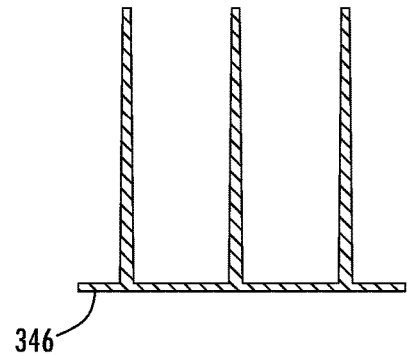
FIG. 16B is a cross-sectional view of the rocker insert, taken at line B-B in FIG. 14.
Figure 16C:
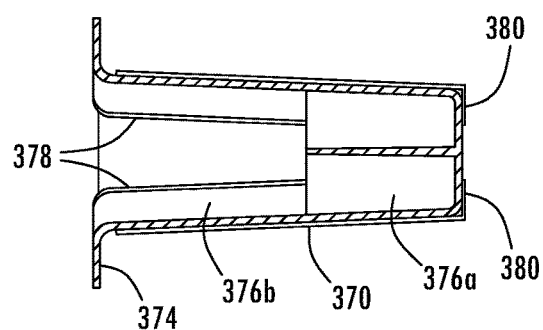
FIG. 16C is a cross-sectional view of the rocker insert, taken at line C-C in FIG. 14.
Figure 16D:
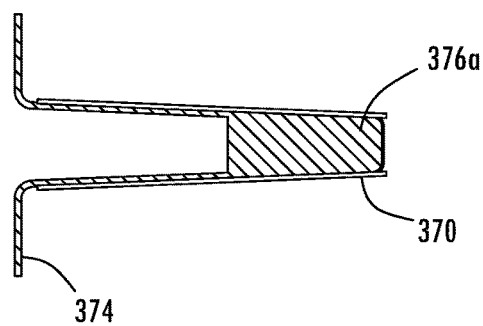
FIG. 16D is a cross-sectional view of the rocker insert, taken at line D-D in FIG. 14.
Figure 17:
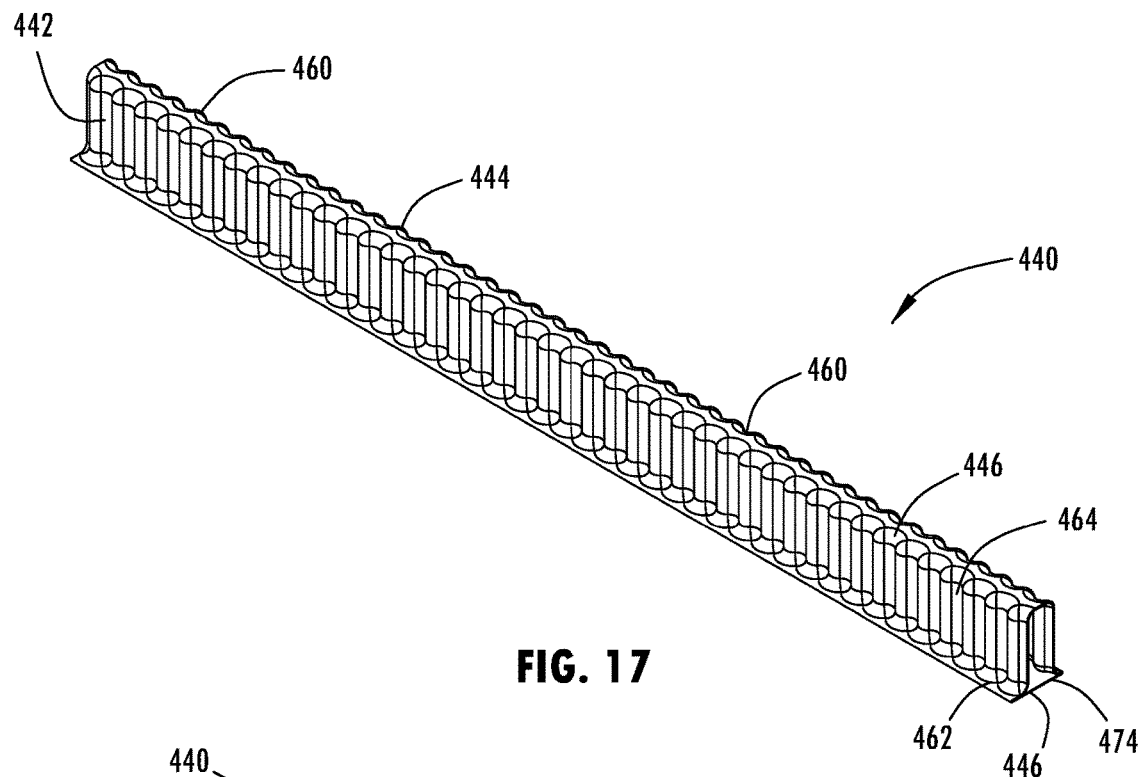
FIG. 17 is a perspective view of another example of a rocker insert.
Figure 18:
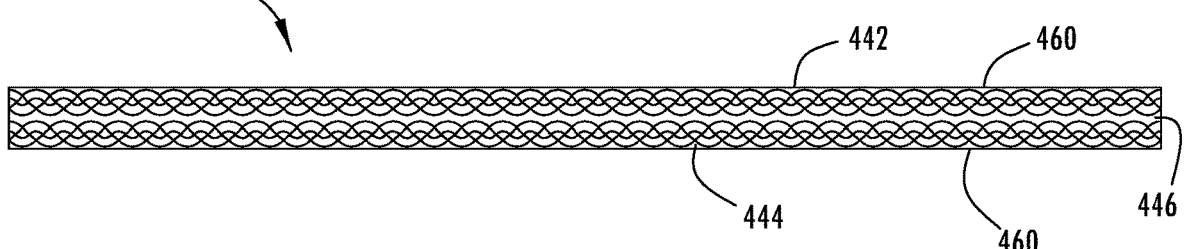
FIG. 18 is a top view of the rocker insert shown in FIG. 17.
Figure 19:
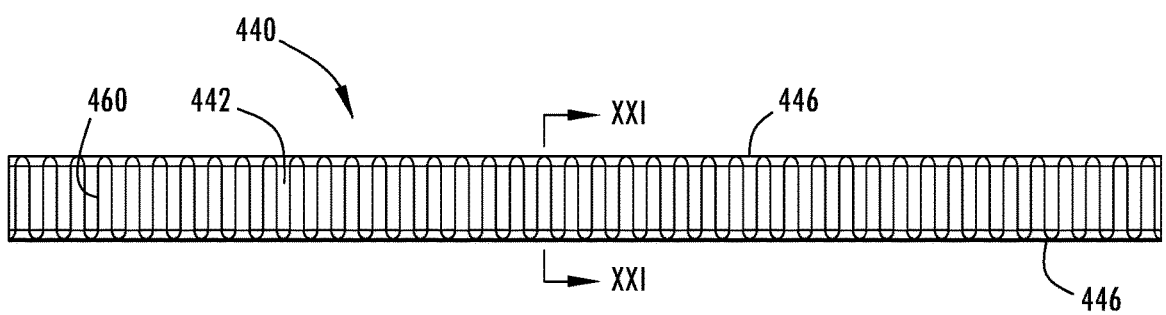
FIG. 19 is a side elevation view of the rocker insert shown in FIG. 17.
Figure 20:
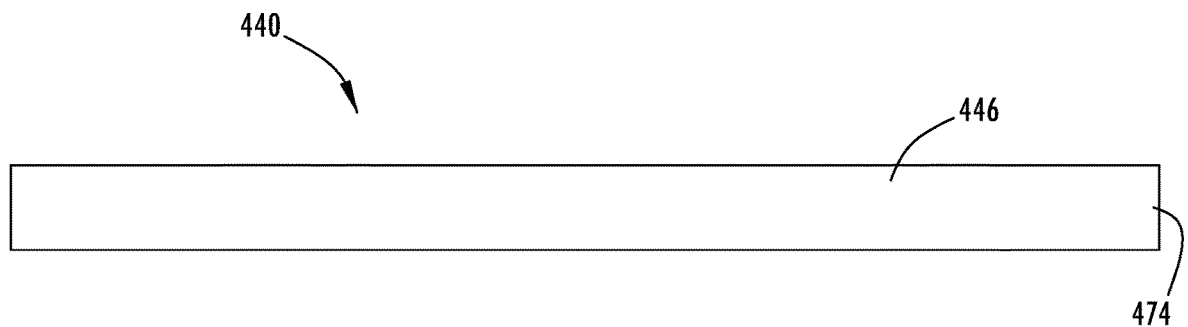
FIG. 20 is a bottom view of the rocker insert shown in FIG. 17.
Figure 21:
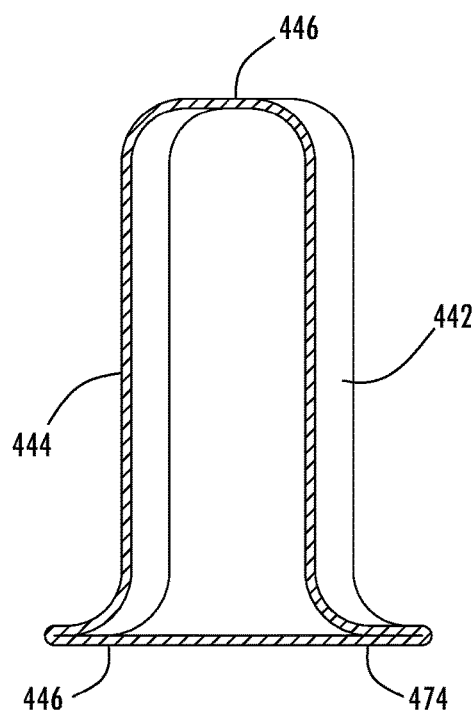
FIG. 21 is a cross-sectional view of the rocker insert taken along the line XXI-XXI shown in FIG. 19.
Figure 22:
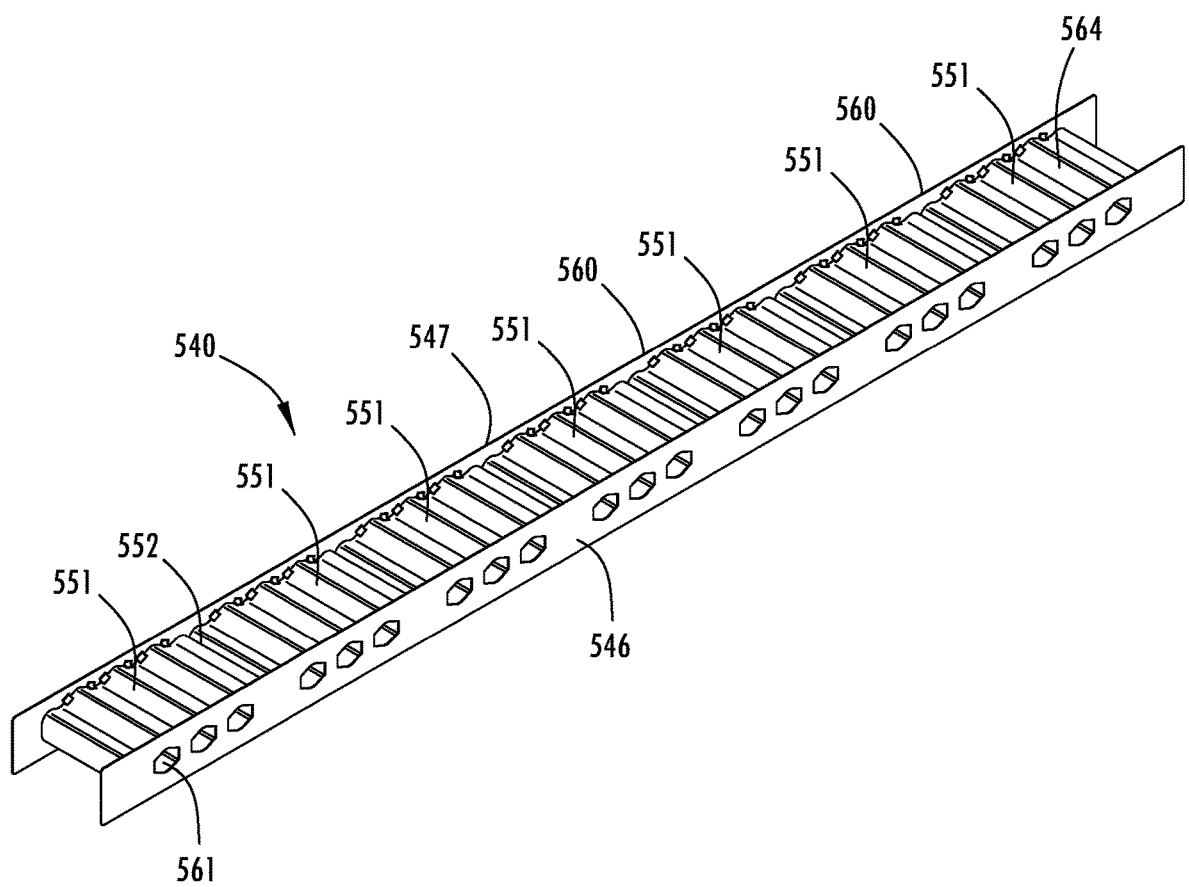
FIG. 22 is a perspective view of another example of a rocker insert.
Figure 23:
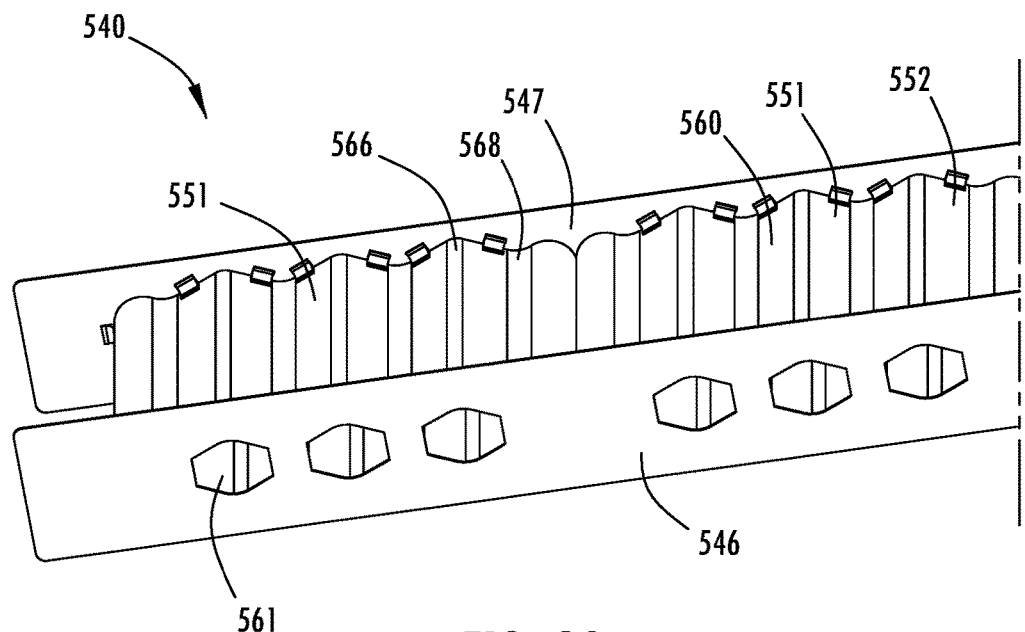
FIG. 23 is an enlarged view of the rocker insert shown in FIG. 22.
Figure 24:
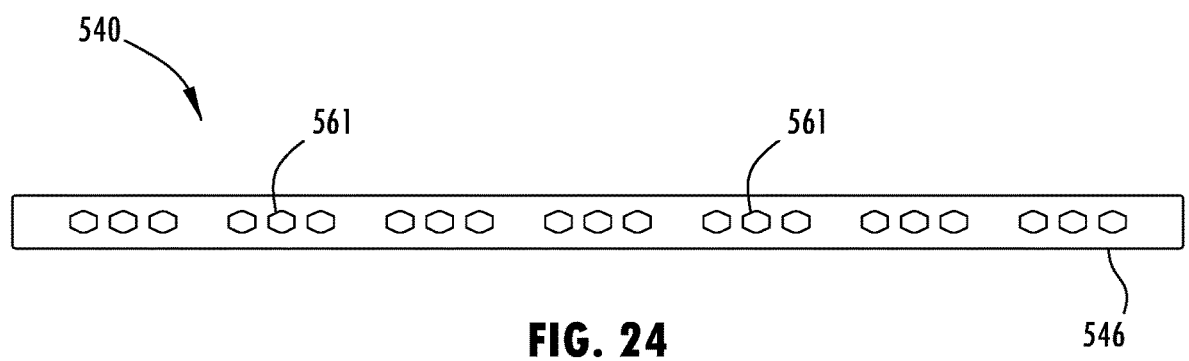
FIG. 24 is a side view of the rocker insert shown in FIG. 22.
Figure 25:
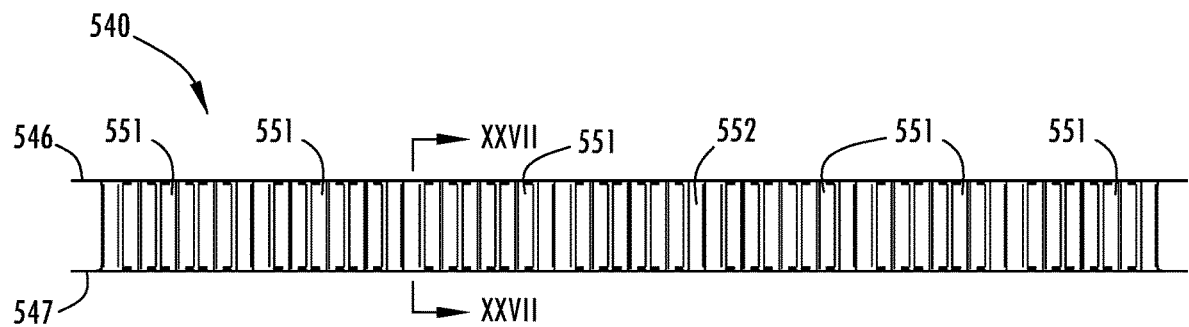
FIG. 25 is top view of the rocker insert shown in FIG. 23.
Figure 26:
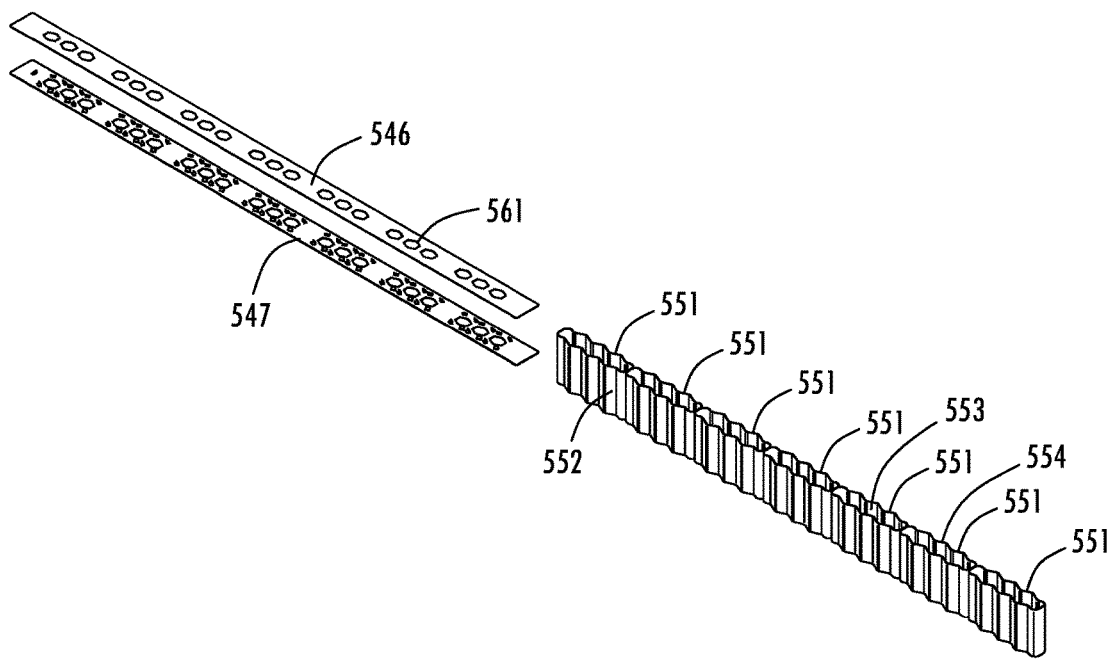
FIG. 26 is an exploded view of the rocker insert shown in FIG. 22.
Figure 27:
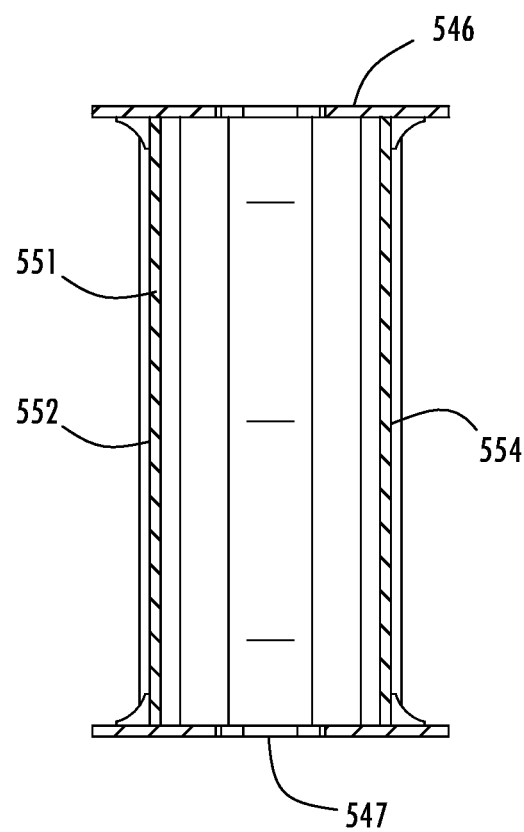
FIG. 27 is a cross-sectional view of the rocker insert taken along the line shown in FIG. 25.

In a further example shown in FIGS. 9-12C, the rocker insert 240 shown is similar to the rocker insert 140 as described above with respect to the example shown in FIGS. 6 and 7. However, as shown in FIGS. 12A-12C, the plastic portion 272 of the rocker insert includes internal ribs 276 that extend between the upper and lower walls to support the hollow interior 250 of the rocker insert. The internal ribs 276 shown in FIG. 12A extend between the vertically adjacent ones of the lowest points 268 of the furrows, such that the internal ribs 276 are oriented substantially vertically in the vehicle. Moreover, the internal ribs 276, as shown in FIG. 12B, taper in thickness as they extend inboard from the outer wall 246.

In yet another example shown in FIGS. 13-16D, the rocker insert 340 shown is similar to the rocker inserts 140 and 240 as described above. However, as shown in FIGS. 16A-16D, the plastic portion 372 of the rocker insert 340 includes additional internal ribs 376a, 376b that provide two tiers of rib structure in the hollow interior 350 of the rocker insert. The outboard set of internal ribs 376a shown in FIG. 16D have reinforcements that extend between the vertically adjacent ones of the lowest points 368 of the furrows, such that these reinforcements of the outboard set of internal ribs 376a are oriented substantially vertically in the vehicle. The outboard set of internal ribs 376a also include horizontal reinforcements that are oriented to extend along the length of the rocker insert. The inboard set of internal ribs 376b are shown integrally extending inboard from the vertical reinforcements of the outboard set of the internal ribs 376a. The inboard set of internal ribs 376b, however, does not span entirely between the upper and lower walls, so as to provide a gap between their interior edges 378, as shown in FIG. 16C. Moreover, the internal ribs, as shown in FIG. 16B, similarly taper in thickness as they extend inboard from the outer wall 346 of the rocker insert 340. Various alternative internal rib structures and reinforcements are contemplated for other examples of rocker inserts.

As further shown in the rocker insert 340 shown in FIGS. 13-16D, the metal sheets that partially form the corrugated portion each include an outboard flange 380 that extends partially over the outer wall 346 of the rocker insert. The outboard flanges 380 may be formed by integral portions of the metal sheet that are bent or stamped or otherwise formed to provide additional mass and reinforcement at the outboard area of the rocker insert 340, which helps support the corrugated portions of the metal sheets in generally horizontal orientation during side impact to the vehicle.

Referring now to the example shown in FIGS. 17-21, the rocker insert 440 shown is similar to the rocker insert 40 as described above with respect to the example shown in FIGS. 3-5B including but not limited to the rocker insert 440 including the upper wall 442, the lower wall 444, the side wall 446 extending between the upper wall 442 and the lower wall 444, and the corrugated portion 460. However, in the example shown in FIGS. 17-21, the rocker insert 440 may also include an integrated flange 474 having a height greater than a height of the side wall 444 in order to secure the rocker insert 440 to various other vehicle components including but not limited to the sill inner 412 and the sill outer 414. The integrated flange 474 may also be configured to allow the side walls 446 to be secured to the upper wall 442 and the lower wall 444. In one example, shown in FIGS. 17-21, the flange 474 is made integral with the rocker insert 440, however, it is contemplated that the flange 474 may be formed separately and later coupled to the remainder of the rocker insert 440. In the example shown, the rocker insert 440 is made a single integral component and the upper and lower walls 442, 444 extend away from the center near the flanged side wall 446 before bending back downward to complete the flange 474. This allows the height of the flange 474 to be greater than the height of the opposite side wall plus the height of the apex of the corrugated portion 460 top and/or bottom surface. In one example, one or more of the upper and lower wall 442, 444 may bend and extend generally perpendicular to and away from the remainder of the upper and lower wall 442, 444 before bending again in the opposite direction, towards the upper and lower wall 442, 444 to form the flange wall. The bending or crimping described provides a smooth surface of adequate size to attach the insert to a sill wall or other vehicle component.

In some examples, the corrugated portion 460 comprises alternating ridges 462 and furrows 464. In the example shown in FIGS. 17-21, the corrugated portion 460 has a ridge 462 oriented to extend in a lateral vehicle direction. The lateral vehicle direction generally extends across the width dimension of the vehicle. In contrast, the longitudinal vehicle direction generally extends along the length dimension of the vehicle. In some examples, an apex 466 of the ridge 462 may be disposed in a generally horizontal plane. The ridges 462 of the corrugated portion 460 are configured to be oriented to generally align with anticipated lateral impacts to the side of a vehicle, so as to provide increased stiffness to the corresponding portion of the upper or lower wall 444 of the rocker insert 440. Moreover, the ridge 462 of the corrugated portion 460 extends at least partially between the sill wall portions of the sill inner 412 and the sill outer 414. In some examples the corrugated portion 460 may be across an entire surface or may be disposed on only a portion of the surface. In the example shown in FIG. 17-21, the ridges 462 and the furrows 464 are generally u-shaped, however various other shapes have also been contemplated. It is also contemplated that the ridge 462 and the furrow 464 may be the same shape or may be different shapes than one another, if desired. Moreover, it is contemplated that the ridges 462 and/or the furrows 464 may be a single repeating shape, may be alternating shapes, or any pattern as desired.

In some examples, a height of the apex 466 of the ridge 462 is the same as the depth of the lowest point 468 on the furrow 464. However, it is also contemplated that the height of the apex 466 and the depth of the lowest point 468 on the furrow 464 may be different than one another such that the height of the apex 466 of the ridge 462 is larger than the depth of the lower point on the furrow 464 or vice versa. Additionally, it is contemplated that the heights of apex 466 of the ridges 462 may remain constant along the corrugated portion 460. However, it is also contemplated that the height of the apex 466 of the ridges 462 may be variable along the corrugated portion 460. Similarly, it is contemplated that the depth of the lowest point 468 on the furrow 464 may remain constant along the corrugated portion 460. However, it is also contemplated that the depth of the lowest point 468 of the furrow 464 may be variable along the corrugated portion 460.

In some examples, a width of the ridge 462 is the same width as the furrow 464. However, it is also contemplated that the width of the ridge 462, measured from a center of one furrow 464 to the center of an adjacent furrow 464, and the width of the furrow 464, measured from the apex 466 of one ridge 462 to the apex 466 of another ridge, may be different than one another such that the width of the ridge 462 is larger than the width of the furrow 464 or such that the width of the furrow 464 is larger than the width of the ridge. Moreover, it is contemplated that the width of the ridges 462 may remain constant along the length of the corrugated portion 460. However, it is also contemplated that the width of the ridge 462 may be variable along the corrugated portion 460. Similarly, it is contemplated that the width of the furrows 464 remain constant along the length of the corrugated portion 460. However, it is also contemplated that the width of the furrow 464 may be variable along the corrugated portion 460.

In some examples the ridge 462 and/or the furrow 464 is generally rounded such that the ridge and/or furrow has a generally u-shape. However, other shapes and configurations are contemplated including but not limited to a v-shape or other angled shape.

In the example shown in FIGS. 17-21, the corrugated portion 460 is disposed on both the top and bottom surface of the upper and lower walls 442, 444 respectively, while the side wall 442 and opposite flange wall are smooth and/or generally flat surfaces. It is contemplated that the ridges 462 and or furrows 464 of the upper and lower wall 442, 444 may slight extend onto the side wall 446 or may extend fully around the side wall 446, if desired.

Referring now to the example shown in FIGS. 22-27, the rocker insert 540 shown is similar to the rocker insert described above with respect to the example shown in FIGS. 3-5B including but not limited to the rocker insert 540 including a top surface 552 and a bottom surface 554 and a corrugated portion 560. However, in the example shown in FIGS. 22-27, the tubular member is comprised of a plurality of metal sheets 551 formed into tube-like sections which are the coupled to one another and to a first and second side wall 546, 547. In the example shown, the tubular member includes seven separate sheet segments 551 which are bent into tube-like structures having a corrugated portion 560 on the top and bottom surface 552, 554. The sheet segments 551 are comprised of an original metal sheet which is then bent and crimped and secured in a tube-like shape having a top surface 552 and a bottom surface 554 connected by a first side surface 553 and a second side surface 555 and defining a hollow interior. The hollow interior of the sheet segment 551 extends between the first side wall 546 and the second side wall 547 of the rocker insert 540. Additionally, one or more of the first side surface 553 and the second side surface 555 are coupled to a first side surface 553 or second side surface 555 of a second sheet segment 551 so as to provide additional fore and aft length. The first sheet segment 551 and the second sheet segment 551 may be welded or otherwise coupled such as by a fastener or adhesive. It is also contemplated that one or more of the sheet segment 551 may include one or more apertures disposed therein, if desired.

Referring still to the example shown in FIGS. 22-27, the corrugated portion 560 is also coupled to the first and second sidewalls 546, 547. The first and second side walls 546, 547 may be identical to or mirror images of one another, or may have one or more aspects which are different from one another, if desired. In the example shown in FIGS. 22-27, the first side wall 546 is a generally planar wall which extends an entire length of the rocker insert 540. As illustrated, the first side wall 546 may include one or more apertures 561 disposed therethrough. The apertures 561 may be designed to decrease weight of the rocker insert 540 and/or provide access for welding or other attachment. Additionally, while the example shown in FIGS. 22-27 illustrates the side wall 546 having a repeating pattern of apertures 561 disposed therethrough, any number, shape, and size, of apertures may be present. Additionally, it is contemplated that one or more of the first and second side walls 546, 547 may be solid such that no aperture is present.

Referring still to the example shown in FIGS. 22-27, the first and second side wall 546, 547 may have a height which is greater than distance between the top surface 552 and the bottom surface 554 of the sheet 551 such that the first and second side wall 546, 547 extend both above and below the top and bottom surface 552, 554 of the sheet 551. In one example, the sheet 551 and the first and second side walls 546, 547 are coupled by welding, however, it is also contemplated that the sheet 551 and the first and second side walls 546, 547 may be coupled by another method such as using a fastener, adhesive, or the like.

In some examples, the corrugated portion 560 comprises alternating ridges 562 and furrows 564. In the example shown in FIGS. 22-27, the corrugated portion 560 has a ridge 562 oriented to extend in a lateral vehicle direction. The lateral vehicle direction generally extends across the width dimension of the vehicle. In contrast, the longitudinal vehicle direction generally extends along the length dimension of the vehicle. In some examples, an apex 566 of the ridge 562 may be disposed in a generally horizontal plane. The ridges 562 of the corrugated portion 560 are configured to be oriented to generally align with anticipated lateral impacts to the side of a vehicle, so as to provide increased stiffness to the corresponding portion of the upper or lower wall 544 of the rocker insert 540. Moreover, the ridge 562 of the corrugated portion 560 extends at least partially between the sill wall portions of the sill inner 512 and the sill outer 514. In some examples the corrugated portion 560 may be across an entire surface or may be disposed on only a portion of the surface. In the example shown in FIG. 22-27, the ridges 562 and the furrows 564 are generally u-shaped, however various other shapes have also been contemplated. It is also contemplated that the ridge 562 and the furrow 564 may be the same shape or may be different shapes than one another, if desired. Moreover, it is contemplated that the ridges 562 and/or the furrows 564 may be a single repeating shape, may be alternating shapes, or any pattern as desired.

In some examples, a height of the apex 566 of the ridge 562 is the same as the depth of the lowest point 568 on the furrow. However, it is also contemplated that the height of the apex 566 and the depth of the lowest point 568 on the furrow 564 may be different than one another such that the height of the apex 566 of the ridge 562 is larger than the depth of the lower point on the furrow 564 or vice versa. Additionally, it is contemplated that the heights of apex 566 of the ridges 562 may remain constant along the corrugated portion 560. However, it is also contemplated that the height of the apex 566 of the ridges 562 may be variable along the corrugated portion 560. Similarly, it is contemplated that the depth of the lowest point 568 on the furrow 564 may remain constant along the corrugated portion 560. However, it is also contemplated that the depth of the lowest point 568 of the furrow 564 may be variable along the corrugated portion 560.

In some examples, a width of the ridge 562 is the same width as the furrow 564. However, it is also contemplated that the width of the ridge 562, measured from a center of one furrow 564 to the center of an adjacent furrow 564, and the width of the furrow 564, measured from the apex 566 of one ridge 562 to the apex 566 of another ridge, may be different than one another such that the width of the ridge 562 is larger than the width of the furrow 564 or such that the width of the furrow 564 is larger than the width of the ridge. Moreover, it is contemplated that the width of the ridges 562 may remain constant along the length of the corrugated portion 560. However, it is also contemplated that the width of the ridge 562 may be variable along the corrugated portion 560. Similarly, it is contemplated that the width of the furrows 64 remain constant along the length of the corrugated portion 560. However, it is also contemplated that the width of the furrow 564 may be variable along the corrugated portion 560.

In some examples the ridge 562 and/or the furrow 564 is generally rounded such that the ridge and/or furrow has a generally u-shape. However, other shapes and configurations are contemplated including but not limited to a v-shape or other angled shape.

It is also contemplated that the internal reinforcements of the disclosed vehicle rocker assembly may be incorporated in other types of structural beams, such as in frames and structures of automotive and marine vehicles, buildings, storage tanks, furniture, and the like. With respect to vehicle applications, the vehicle component disclosed herein may be incorporated with various applications of different structural components. The vehicle component may be designed to support and sustain different loading conditions, such as for supporting certain horizontal spans or axial loading conditions. Also, the vehicle component may be designed to undergo various impact forces, such as for the illustrated rocker assemblies, pillar structures, and the like. The cross-sectional geometry, material type selections, and material thickness within the cross-sectional profile of the vehicle component may be configured for such a particular use and the desired loading and performance characteristics, such as the weight, load capacity the beam, force deflection performance, and impact performance of the vehicle component.

For purposes of this disclosure, the articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional implementations that also incorporate the recited features. Furthermore, the terms "first," "second," and the like, as used herein do not denote any order, quantity, or importance, but rather are used to denote element from another.

Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. For example, the terms "approximately," "about," and "substantially" may refer to an amount that is within less than 5% of, within less than 1% of, within less than 0.1% of, and within less than 0.01% of a stated amount.

Further, it should be understood that any directions or reference frames in the preceding description are merely relative directions or movements. For example, the terms "upper," "lower," "right," "left," "rear," "front," "vertical," "horizontal," "inboard," "outboard" and derivatives thereof shall relate to the orientation shown in FIG. 1. However, it is to be understood that various alternative orientations may be provided, except where expressly specified to the contrary. It is also to be understood that the specific devices and processes illustrated in the attached drawings, and described in this specification are simply exemplary embodiments of the inventive concepts defined in the appended claims. Hence, specific dimensions and other physical characteristics relating to the embodiments disclosed herein are not to be considered as limiting, unless the claims expressly state otherwise.

Changes and modifications in the specifically described embodiments may be carried out without departing from the principles of the present invention, which is intended to be limited only by the scope of the appended claims as interpreted according to the principles of patent law. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A vehicle rocker assembly comprising:
a sill inner;
a sill outer coupled with the sill inner to define an elongated hollow interior between the sill inner and the sill outer; and
a rocker insert disposed within the elongated hollow interior, the rocker insert comprising a corrugated portion that has a ridge oriented to extend in a lateral vehicle direction between the sill inner and the sill outer,
wherein the rocker insert comprises a tubular member extending longitudinally along the elongated hollow interior and at least partially defined by an upper wall, a lower wall, and opposing side walls extending between the upper wall and the lower wall, and
wherein at least one of the upper wall or the lower wall include the corrugated portion of the rocker insert with the ridge extending at least partially between the opposing side walls of the rocker insert.

2. The vehicle rocker assembly of claim 1, wherein the corrugated portion comprises at least a portion of metal sheet.

3. The vehicle rocker assembly of claim 1, wherein a cross-sectional shape of the corrugated portion along a longitudinal vehicle direction comprises a wave shape with a series of ridges extending in parallel with each other.

4. The vehicle rocker assembly of claim 1, wherein the ridge is a v-shaped ridge.

5. The vehicle rocker assembly of claim 1, wherein the corrugated portion comprises alternating ridges and furrows.

6. The vehicle rocker assembly of claim 5, wherein the furrow is a v-shaped furrow.

7. A vehicle rocker assembly comprising:
a sill inner comprising an inner wall portion, an inner upper flange portion, and an inner lower flange portion;

a sill outer comprising an outer wall portion, an outer upper flange portion, and an outer lower flange portion;

wherein the inner upper flange portion is coupled with the outer upper flange portion and the inner lower flange portion is coupled with the outer lower flange portion to define an elongated hollow interior between the inner and outer wall portions of the sill inner and the sill outer; and a rocker insert disposed within the elongated hollow interior, the rocker insert comprising:
   an upper wall,
   a lower wall, and
   a side wall extending between the upper wall and the lower wall, wherein at least one of the upper wall or the lower wall comprises a corrugated portion that has a ridge oriented to extend laterally between the sill inner and the sill outer, and wherein the upper wall, the lower wall, and the side wall at least partially define a tubular member extending longitudinally along the elongated hollow interior.

8. The vehicle rocker assembly of claim 7, wherein the ridge of the corrugated portion extends continuously between the inner and outer wall portions of the sill inner and the sill outer.

9. The vehicle rocker assembly of claim 7, wherein the side wall is coupled with the sill inner or the sill outer to support the rocker insert in the elongated hollow interior.

10. The vehicle rocker assembly of claim 7, wherein the tubular member comprises a hollow interior that is at least partially surrounded by the upper wall, the lower wall, and the side wall.

11. The vehicle rocker assembly of claim 7, wherein the corrugated portion is disposed on both a top surface and bottom surface of the upper wall.

12. The vehicle rocker assembly of claim 7, wherein the corrugated portion is disposed in both a top surface and a bottom surface of the lower wall.

13. The vehicle rocker assembly of claim 7, wherein the upper wall and the lower wall each comprise the corrugated portion and the longitudinal cross-sectional shapes of upper and lower walls comprise a wave shape defining the corrugated portion.

14. The vehicle rocker assembly of claim 7, wherein the corrugated portion comprises a wave shape defined by alternating ridges and furrows.

15. A rocker insert for a vehicle rocker assembly having a sill inner including upper and lower flanges and a sill outer including upper and lower flanges with an elongated hollow interior defined between the sill inner and the sill outer, with the rocker insert disposed within the elongated hollow interior and comprising:
   an upper wall;
   a lower wall; and
   a side wall extending between the upper wall and the lower wall, wherein the upper wall, the lower wall, and the side wall at least partially define a tubular member extending in a longitudinal vehicle direction, and wherein at least one of the upper wall or the lower wall comprises a corrugated portion that has a peak extending in a lateral vehicle direction between an inboard edge and an outboard edge of the respective upper or lower wall.

16. The rocker insert of claim 15, wherein the ridge of the corrugated portion is configured to extend between the sill wall portions of the sill inner and the sill outer.

17. The rocker insert of claim 15, wherein the side wall is coupled with the sill inner or the sill outer to support the rocker insert in the elongated hollow interior.

18. The vehicle rocker assembly of claim 1, wherein the corrugated portion is disposed on both a top surface and a bottom surface of the upper wall, defining the corrugated portion with a thickness of the upper wall.

19. The vehicle rocker assembly of claim 1, wherein the corrugated portion is disposed on both a top surface and a bottom surface of the lower wall, defining the corrugated portion with a thickness of the lower wall.

* * * * *